United States Patent
Schmid

(10) Patent No.: US 6,932,203 B2
(45) Date of Patent: Aug. 23, 2005

(54) TORQUE CONVERTER

(75) Inventor: Herbert Schmid, Münnerstadt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/451,548

(22) PCT Filed: Oct. 24, 2001

(86) PCT No.: PCT/EP01/12256
§ 371 (c)(1),
(2), (4) Date: Jun. 23, 2003

(87) PCT Pub. No.: WO02/052175
PCT Pub. Date: Jul. 4, 2002

(65) Prior Publication Data
US 2004/0050640 A1 Mar. 18, 2004

(30) Foreign Application Priority Data
Dec. 22, 2000 (DE) .......................................... 100 64 682

(51) Int. Cl.$^7$ ........................................... F16H 45/02
(52) U.S. Cl. ..................................................... 192/3.3
(58) Field of Search ............................... 192/3.28, 3.29, 192/3.3; 60/330, 361, 364, 365, 366

(56) References Cited

U.S. PATENT DOCUMENTS

| | | | |
|---|---|---|---|
| 5,215,173 A | | 6/1993 | Gimmler |
| 5,950,483 A | | 9/1999 | Schneider et al. |
| 5,964,328 A | * | 10/1999 | Fallu et al. ................ 192/3.29 |
| 6,059,082 A | * | 5/2000 | Fitzpatrick-Ellis et al. .......................... 192/3.29 |
| 6,428,417 B2 | * | 8/2002 | Wakizaka et al. ............. 464/24 |
| 6,431,335 B1 | * | 8/2002 | Kundermann ............... 192/3.3 |

FOREIGN PATENT DOCUMENTS

FR 2 556 807 A1 12/1983

* cited by examiner

Primary Examiner—Saul Rodriguez
(74) Attorney, Agent, or Firm—Cohen, Pontani, Lieberman & Pavane

(57) ABSTRACT

A torque converter comprises a pump rotor, a turbine rotor, and a stator. The turbine rotor is fixed to a gearbox input shaft. The gearbox input shaft forms an axial duct with an initial zone and an end zone for a hydraulic fluid. The gearbox input shaft further comprises a shaft core and a shaft sleeve, surrounding the shaft core, fixed against rotation to each other. The shaft core and shaft sleeve are matched to each other in such a manner that the shaft core runs radially in the shaft sleeve with no play and the shaft core and the shaft sleeve together form the axial duct.

11 Claims, 3 Drawing Sheets

TORQUE CONVERTER

PRIORITY CLAIM

This is a U.S. national stage of application No. PCT/EP01/12256, filed on Oct. 24, 2001. Priority is claimed on that application and on the following application(s): Country: Germany, Application No.: 100 64 682.4, Filed: Dec. 22, 2000.

BACKGROUND OF THE INVENTION

1. Field of the Invention

The present invention relates to a torque converter comprising a pump rotor, a turbine rotor that can be driven by the pump rotor and a stator, the turbine rotor being firmly connected to a transmission input shaft so as to rotate with it, the transmission input shaft forming an axial duct with an initial region and a final region for a hydraulic fluid.

2. Description of the Related Art

A torque converter of this type is disclosed, for example, by DE 41 21 586 A1 corresponding to U.S. Pat. No. 5,215,273, or DE 195 40 294 A1, corresponding to U.S. Pat. No. 5,950,483.

In torque converters, the axial duct is generally formed as a central bore. In order to connect the central bore to a feed opening, radial bores are introduced into the transmission input shaft in the initial region, via which bores the central bore is connected to a feed opening for the hydraulic fluid. In practice, it has transpired that, in individual cases, stress cracks can occur in the transmission input shaft in the region of the radial bores.

SUMMARY OF THE INVENTION

The object of the present invention is to configure the axial duct in such a way that no more radial bores have to be introduced into the transmission input shaft.

The object is achieved in that the transmission input shaft has a shaft core and a shaft sleeve that surrounds the shaft core and in that the shaft core and the shaft sleeve are firmly connected to each other so as to rotate with each other and are matched to each other in such a way that the shaft core is guided radially without play in the shaft sleeve, and the shaft core and the shaft sleeve form the axial duct between them.

The configuration of the axial duct according to the invention further achieves the situation where the length of the axial duct can be varied as desired. In particular, it is therefore possible for the stator, which is normally arranged on a stator bushing, to be arranged axially between the initial region and the final region.

If the turbine rotor has a turbine rotor hub which is firmly connected to the shaft core so as to rotate with it via toothing with interacting teeth and tooth receptacles, the final region extends as far as the turbine rotor hub and is sealed off in a liquid-tight manner with respect to the latter, and the toothing is formed in such a way that it forms at least one passage opening for the hydraulic fluid, it is even possible to produce a hydraulic connection with a chamber which is arranged axially downstream of the turbine rotor hub.

In order to form the passage opening, it is for example possible for at least one of the tooth receptacles to accommodate a tooth which bears tangentially on both sides of the tooth receptacle and ends radially before reaching the bottom of the tooth receptacle. Alternatively or additionally, at least one of the tooth receptacles can have no tooth.

Connecting the axial duct to a chamber which is arranged downstream of the turbine rotor hub is advantageous in particular when the axial duct is connected via the at least one passage opening to a piston chamber, the piston chamber is closed off on one side by a piston and, by means of the piston, a bridging clutch can be actuated, by means of which the turbine rotor can be firmly connected to the pump rotor so as to rotate with it.

If, axially between the initial region and the final region, the shaft sleeve has a central region which, in a contact part of its inner circumference, bears on the shaft core and, in a flow part of its inner circumference, is at a distance from the shaft core, the transmission input shaft is constructed particularly stably. In this case, the shaft core can alternatively be of substantially rotationally symmetrical design and the shaft sleeve can have internal projections in the central region, or the shaft sleeve can be of substantially rotationally symmetrical design and the shaft core can have external projections in the central region.

If the initial region in the axial direction is sealed off in a liquid-tight manner, radial feeding of the hydraulic fluid is particularly effective. Radial feeding can, for example, be achieved by the initial region being surrounded radially in a liquid-tight manner by a casing, the casing being able to rotate relative to the transmission input shaft, the casing and the transmission input shaft forming an annular duct connected to the initial region, and the casing having a feed opening for the hydraulic fluid.

It is possible to use the axial duct according to the invention in addition to a conventional configuration of the transmission input shaft, that is to say in addition to a central bore having radial bores. Preferably, however, the configuration of shaft core and shaft sleeve replaces the bores of the prior art. It is therefore even possible for the transmission input shaft to be constructed without bores.

DETAILED DESCRIPTION OF THE PRESENTLY PREFERRED EMBODIMENTS

Figure 1:
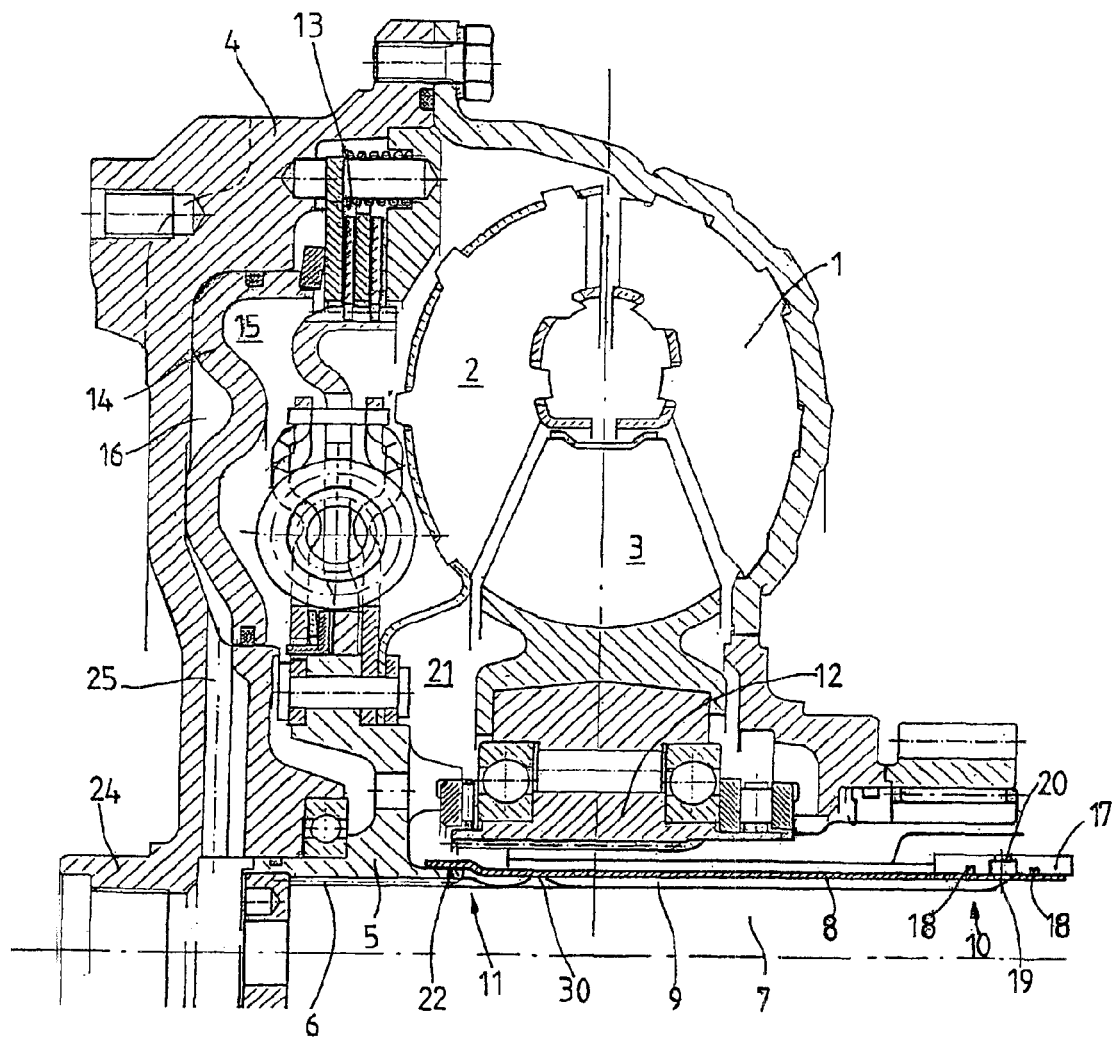
FIG. 1 shows a section through a torque converter.

According to FIG. 1, a torque converter has a pump rotor 1, a turbine rotor 2 and a stator 3. The pump rotor 1 is firmly connected to a housing shell 4 so as to rotate with it, generally being welded or—as here—screwed. Via the housing shell 4, the pump rotor 1 is rigidly coupled to an output shaft—not illustrated for reasons of clarity—of an engine. The turbine rotor 2 can be driven by the pump rotor 1. It has a turbine rotor hub 5.

The turbine rotor hub 5 is firmly connected to a shaft core 7 so as to rotate with it via toothing 6. A shaft sleeve 8 is pushed onto the shaft core 7 and surrounds the shaft core 7. The shaft core 7 and the shaft sleeve 8 are firmly connected to each other so as to rotate and together form a transmission input shaft 7, 8.

The transmission input shaft 7, 8 forms an axial duct 9 for a hydraulic fluid. The axial duct 9 is in this case formed by the shaft core 7 and the shaft sleeve 8 being matched to each other in such a way that the shaft core 7 is guided radially without play in the shaft sleeve 8, and the shaft core 7 and the shaft sleeve 8 form the axial duct 9 between them. The axial duct 9 has an initial region 10 and a final region 11.

The stator 3, as is generally common, is arranged on a stator bushing 12. The stator bushing 12 is fixed in position with respect to the torque converter.

The torque converter also has a bridging clutch 13. By means of the bridging clutch 13, the turbine rotor 2 can be firmly connected or rigidly coupled to the pump rotor 1 so as to rotate with it. The bridging clutch 13 can be actuated by means of a piston 14. The piston 14, together with the turbine rotor 2 and the housing shell 4, encloses a piston chamber 15 on the turbine rotor side and a piston chamber 16 on the housing shell side. In this case, the piston 14 in each case forms one side of the piston chambers 15, 16.

The initial region 10 is sealed off in a liquid-tight manner in the axial direction. The liquid-tight closure can be achieved, for example, by the shaft core 7 widening in the initial region 10. If appropriate, a seal can additionally be provided. This is not illustrated in the Figures, for reasons of clarity.

In order to feed the hydraulic fluid in and out, the initial region 10 is surrounded radially in a liquid-tight manner by a casing 17. The liquid-tight closure in this case is achieved by seals 18. The casing 17 is arranged in a fixed position. It therefore does not corotate with the transmission input shaft 7, 8. It can therefore be rotated relative to the transmission input shaft 7, 8. The casing 17 and the transmission input shaft 7, 8 form an annular duct 19, which is connected to the initial region 10. The casing 17 also has a feed opening 20 for the hydraulic fluid.

In principle, the axial duct 9 can have any desired length. It is, for example, possible for it to extend beyond the stator bushing 12 in the axial direction. In other words: it is possible for the stator bushing 12 to be arranged axially between the initial region 10 and the final region 11. In the case of such a configuration, it would be possible for example to connect the feed opening 20 to a chamber 21 which is arranged between the stator bushing 12 and the turbine rotor hub 5.

According to FIG. 1, however, the axial duct 9 even extends as far as the turbine rotor hub 5. Without further measures, in this case it would be possible, for example, to connect the feed opening 20 to the piston chamber 15 on the turbine rotor shell side. According to FIG. 1, however, the final region 11 is sealed off in a liquid-tight manner with respect to the turbine rotor hub 5 by means of a seal 22. On the other hand, the toothing 6—see FIG. 2—is formed in such a way that it forms at least one passage opening 23 for the hydraulic fluid. As a result, it is possible to connect the feed opening 20 via the axial duct 9 to a chamber close to the bearing journal 24. The chamber in the region of the bearing journal 24 is then connected via radial ducts 25 to the piston chamber 16 on the housing shell side.

Figure 2:
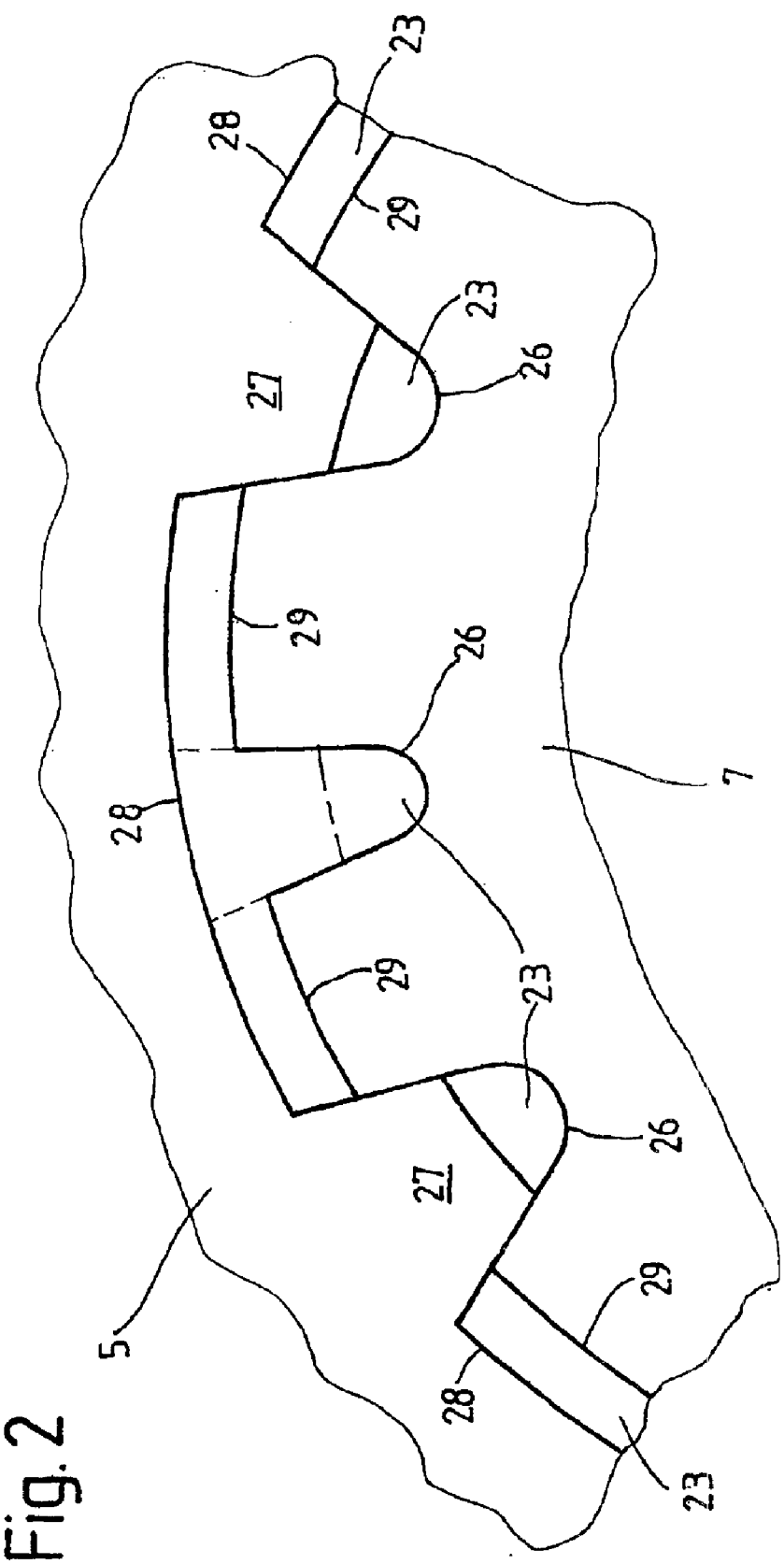
FIG. 2 is a schematic section view of the transmission shaft core and the turbine rotor hub.

According to FIG. 2, the shaft core 7 has tooth receptacles 26 which interact with teeth 27 on the turbine rotor hub 5. The tooth receptacles 26 and the teeth 27 together form the toothing between the turbine rotor hub 5 and shaft core 7, by means of which the turbine rotor 2 is firmly connected to the shaft core 7 so as to rotate with it. As can be seen, the teeth 27 are keyed to the tooth receptacles 26. The teeth 27 therefore bear tangentially on both sides of the tooth receptacles 26 by which they are accommodated. Radially, on the other hand, the teeth 27 end before reaching the bottom of the respective tooth receptacle 26. The passage openings 23 are already formed in this way. Furthermore, the inner side 28 of the turbine rotor hub 5 is at a distance from the outer side 29 of the shaft core 7. Passage openings 23 are also formed in this way.

As a rule, the passage openings 23 formed in this way will be sufficient to ensure a sufficient flow of the hydraulic fluid. If a still higher flow is to be achieved, however, it is also possible to leave out individual teeth entirely. In this case, at least one of the tooth receptacles 26 has no tooth. This is illustrated in FIG. 2 by the left-out tooth, indicated only dashed.

In principle, it is sufficient to mount the shaft sleeve 8 on the shaft core 7 only in the initial region 10 and in the final region 11. In a central region 30, the shaft sleeve 8 can be at a distance from the shaft core 7. Preferably, however, in the central region 30, the shaft sleeve 8 bears on the shaft core 7 in a contact region 31 of its inner circumference. It is at a distance from the shaft core 7 only in a flow part 32 of its inner circumference.

Figure 3:
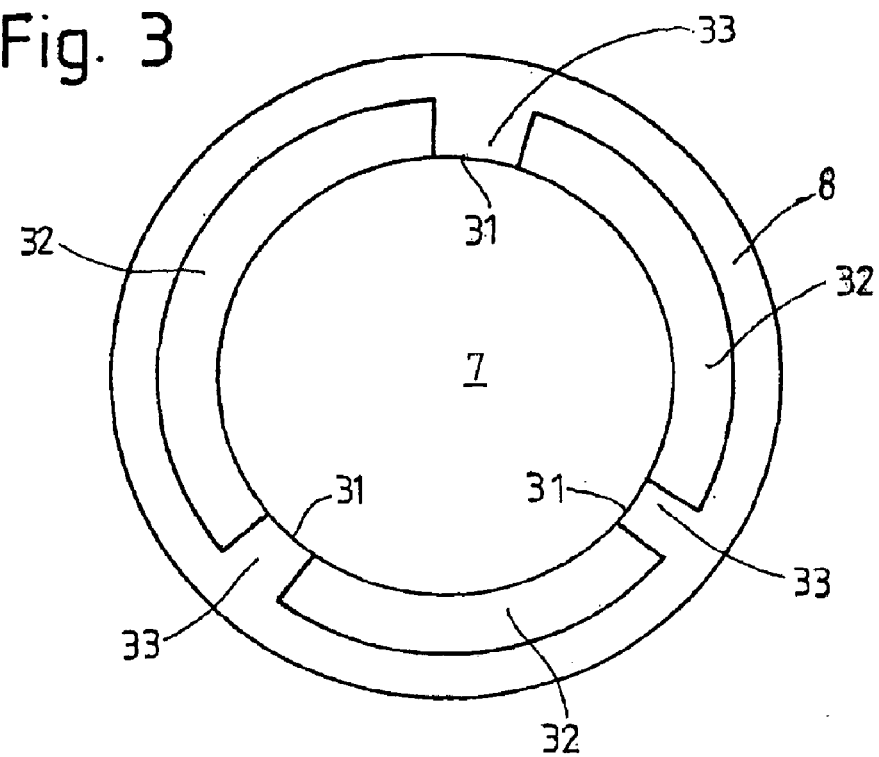
FIG. 3 is a schematic section view of the transmission shaft core and sleeve in a central region.
Figure 4:
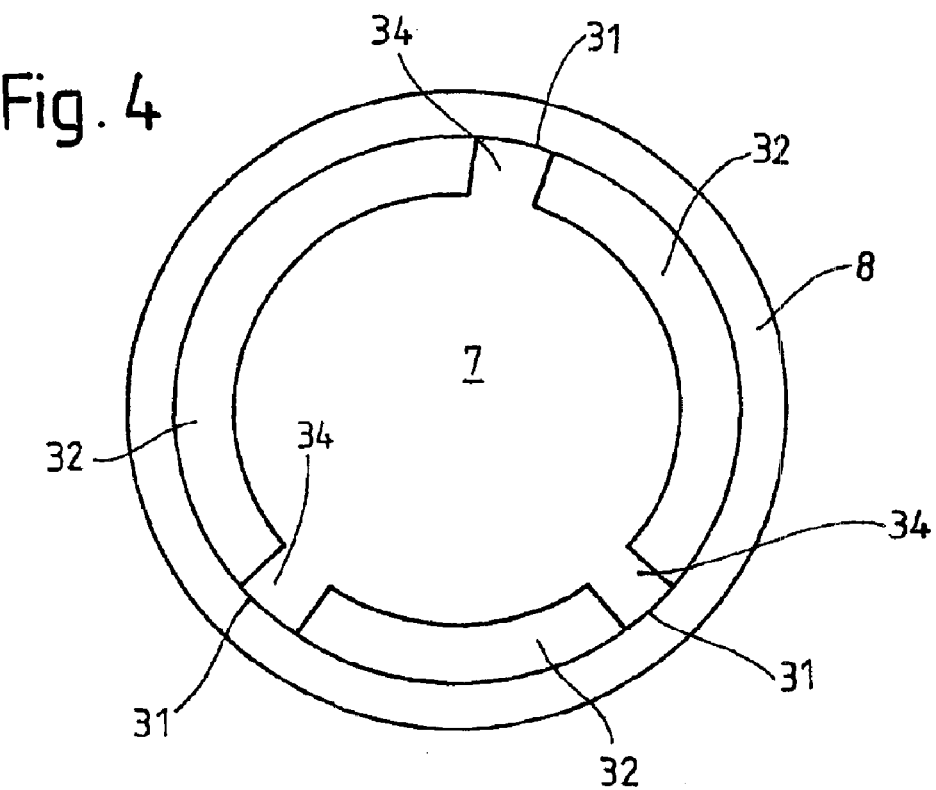
FIG. 4 is schematic section, similar to FIG. 3, of an alternate arrangement.

According to FIG. 3, provision is made for this purpose for the shaft core 7 to be of substantially rotationally symmetrical design in the central region 30 and for the shaft sleeve 8 to have internal projections 33 in the central region 30. Alternatively, however, according to FIG. 4, it is also possible for the shaft sleeve 8 to be of substantially rotationally symmetrical design in the central region 30 and for the shaft core 7 to have external projections 34 in the central region 30.

By means of the configuration according to the invention of the transmission input shaft 7, 8, it is possible to dispense both with the central bore and with the radial bores from the prior art. It is therefore possible to construct the transmission input shaft 7, 8 completely without bores. However, it is also possible to provide the axial duct 9 according to the invention in addition to a central bore according to the prior art.

What is claimed is:

1. A torque converter comprising:
   a transmission input shaft comprising a shaft core and a shaft sleeve surrounding the shaft core and fixed against rotation with respect to said shaft core, said core being guided without radial play in the sleeve, said core and said sleeve forming therebetween an axial duct having an initial region and a final region for passing hydraulic fluid, said shaft core being constructed without bores,
   a turbine rotor fixed against rotation relative to said transmission input shaft;
   a pump rotor which can drive the turbine rotor; and
   a stator arranged between the turbine rotor and the pump rotor.

2. A torque converter as in claim 1 further comprising a stator bushing arranged axially between the initial region and the final region, the stator being arranged on the stator bushing.

3. A torque converter as in claim 1 wherein said initial region is arranged proximate one end of said axial duct and said final region is arranged proximate the opposing end of said axial duct and said axial duct further comprises a central region arranged axially between said initial region and said final region of said axial duct, said shaft sleeve in said central region having a contact part which bears on the shaft core and a flow part spaced from said shaft core.

4. A torque converter as in claim 1 wherein said initial region of said axial duct is sealed in a liquid tight manner in the axial direction.

5. A torque converter as in claim 1 further comprising a casing surrounding said sleeve in a liquid tight manner in said initial region, said casing and said sleeve forming an annular duct for supplying hydraulic to said axial duct through an opening in said sleeve, said casing having a feed opening for supplying hydraulic fluid to the annular duct.

6. A torque converter comprising:
a transmission input shaft comprising a shaft core and a shaft sleeve surrounding the shaft core and fixed against rotation with respect to said shaft core, said core being guided without radial play in the sleeve, said core and said sleeve forming therebetween an axial duct having an initial region and a final region for passing hydraulic fluid,
a turbine rotor fixed against rotation relative to said transmission input shaft, wherein said turbine rotor comprises a hub which is fixed to said transmission shaft core by teeth which are arranged to prevent rotation of said sleeve relative to said core, said teeth being arranged to form at least one passage for hydraulic fluid, said final region extending to said hub, said sleeve being sealed to said hub in a liquid tight manner;
a pump which can drive the turbine rotor; and
a stator arranged between the turbine rotor and the pump rotor.

7. A torque converter as in claim 6 wherein said teeth form tooth receptacles having bottoms between said teeth, said at least one passage being formed by a space formed between the bottom of a tooth receptacle and a tooth received in said receptacle.

8. A torque converter as in claim 6 wherein said teeth form tooth receptacles between said teeth said at least one passage being formed by a receptacle which receives no tooth.

9. A torque converter as in claim 6 further comprising
a piston chamber which is connected to the axial duct via the at least one passage,
a piston actuated by hydraulic fluid in said chamber; and
a bridging clutch actuated by said piston to connect said pump rotor to said turbine rotor.

10. A torque converter comprising:
a transmission input shaft comprising a shaft core and a shaft sleeve surrounding the shaft core and fixed against rotation with respect to said shaft core, said core being guided without radial play in the sleeve, said core and said sleeve forming therebetween an axial duct having an initial region and a final region for passing hydraulic fluid, wherein said axial duct further comprises a central region between said initial region and said final region, said shaft sleeve in said central region having a contact part which bears on the shaft core and a flow part spaced from said shaft core, said shaft core is rotationally symmetric, and said shaft sleeve has internal projections in the central region,
a turbine rotor fixed against rotation relative to said transmission input shaft;
a pump rotor which can drive the turbine rotor; and
a stator arranged between the turbine rotor and the pump rotor.

11. A torque converter comprising:
a transmission input shaft comprising a shaft core and a shaft sleeve surrounding the shaft core and fixed against rotation with respect to said shaft core, said core being guided without radial play in the sleeve, said core and said sleeve forming therebetween an axial duct having an initial region and a final region for passing hydraulic fluid, wherein said axial duct further comprises a central region between said initial region and said final region, said shaft sleeve in said central region having a contact part which bears on the shaft core and a flow part spaced from said shaft core, said shaft sleeve is rotationally symmetric, and said shaft core has external projections in the central regions,
a turbine rotor fixed against rotation relative to said transmission input shaft;
a pump rotor which can drive the turbine rotor; and
a stator arranged between the turbine rotor and the pump rotor.

* * * * *